(12) United States Patent
Ventura et al.

(10) Patent No.: US 7,731,288 B2
(45) Date of Patent: Jun. 8, 2010

(54) MOTOR VEHICLE SEAT FEATURING COUPLING BETWEEN THE BACKREST MOVEMENT AND THE SEAT PART MOVEMENT, AND MOTOR VEHICLE COMPRISING SUCH A MOTOR VEHICLE SEAT

(75) Inventors: Kevin J. Ventura, Paris (FR); Bernd Winkelhake, Gifhorn (DE)

(73) Assignee: Intier Automotive Seating Systems GmbH, Sailauf (DE)

( * ) Notice: Subject to any disclaimer, the term of this patent is extended or adjusted under 35 U.S.C. 154(b) by 0 days.

(21) Appl. No.: 12/160,038

(22) PCT Filed: Jan. 5, 2007

(86) PCT No.: PCT/EP2007/000056
§ 371 (c)(1),
(2), (4) Date: Jul. 17, 2008

(87) PCT Pub. No.: WO2007/077222
PCT Pub. Date: Jul. 12, 2007

(65) Prior Publication Data
US 2009/0079247 A1 Mar. 26, 2009

(30) Foreign Application Priority Data
Jan. 5, 2006 (DE) .................... 10 2006 001 013

(51) Int. Cl.
*A47C 1/00* (2006.01)
*B60N 2/00* (2006.01)
(52) U.S. Cl. .................. 297/341; 297/340; 297/378.14; 297/378.1
(58) Field of Classification Search .............. 297/378.1, 297/378.12, 378.14, 331, 340, 341; 296/65.09
See application file for complete search history.

(56) References Cited

U.S. PATENT DOCUMENTS

| 3,311,405 | A |   | 3/1967  | Brennan et al. |
| 3,762,766 | A | * | 10/1973 | Barecki et al. ............ 297/217.1 |
| 5,240,309 | A | * | 8/1993  | Kojer .................... 297/378.12 |
| 5,957,522 | A | * | 9/1999  | Matsuhashi et al. ........... 296/66 |
| 6,000,742 | A |   | 12/1999 | Schaefer et al. |
| 6,663,157 | B1| * | 12/2003 | Hofmann et al. ......... 296/65.03 |
| 7,017,994 | B2| * | 3/2006  | Suck et al. .................. 297/341 |

(Continued)

FOREIGN PATENT DOCUMENTS

DE          19957380 C1     3/2001

(Continued)

*Primary Examiner*—David Dunn
*Assistant Examiner*—Erika Garrett

(57) ABSTRACT

The present invention relates to a motor vehicle seat (2) comprising a seat part (6) which may be moved by means of a seat part mechanism (20) from an operating position into a non-operating position, a backrest (4) which may be swiveled by means of a backrest mechanism (8) about a swivel pin (10) in the direction of the seat part (6), and a coupling element (44) for coupling the movement of the backrest (4) to the movement of the seat part (6), the coupling element (44) cooperating with the backrest mechanism (8) and the seat part mechanism (20) such that the coupling element (44) exerts a tensile force on the seat part mechanism (20), in order to move the seat part (6) from the operating position into the non-operating position.

3 Claims, 5 Drawing Sheets

U.S. PATENT DOCUMENTS

Figure 1:
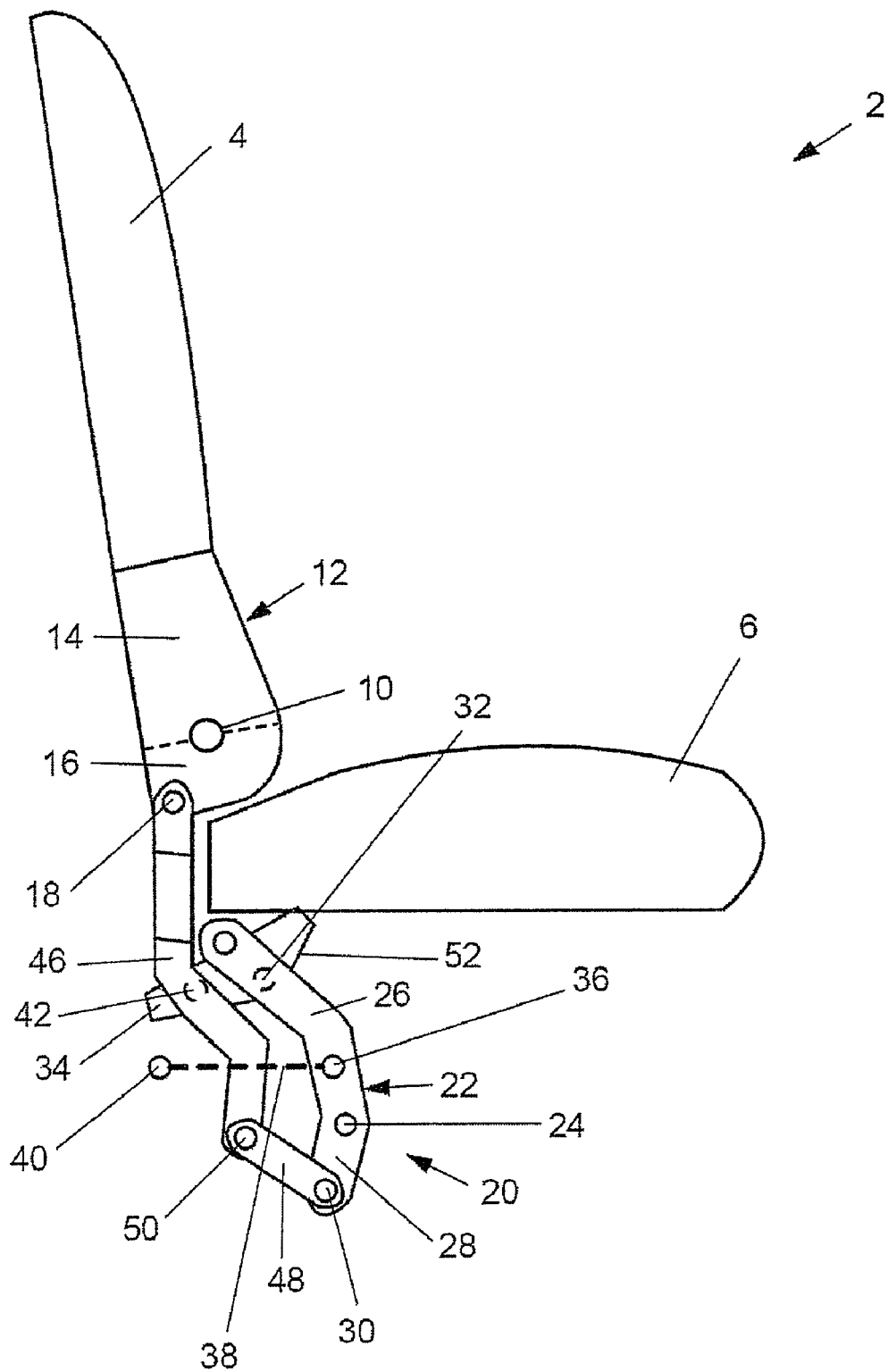

| | | | |
|---|---|---|---|
| 7,178,873 B2 * | 2/2007 | Foelster et al. | 297/253 |
| 7,252,337 B2 * | 8/2007 | Hofmann et al. | 297/383 |
| 7,380,885 B2 * | 6/2008 | Fischer et al. | 297/378.12 |

FOREIGN PATENT DOCUMENTS

| | | | |
|---|---|---|---|
| DE | 10131399 | C1 | 1/2003 |
| DE | 10317238 | A1 | 10/2004 |
| DE | 10335867 | B3 | 2/2005 |
| DE | 10355765 | A1 | 6/2005 |
| EP | 1375242 | A | 1/2004 |
| EP | 1535792 | A | 6/2005 |

* cited by examiner

MOTOR VEHICLE SEAT FEATURING COUPLING BETWEEN THE BACKREST MOVEMENT AND THE SEAT PART MOVEMENT, AND MOTOR VEHICLE COMPRISING SUCH A MOTOR VEHICLE SEAT

The present invention relates to a motor vehicle seat in which the movement of the backrest is coupled to the movement of the seat part, as well as a motor vehicle comprising such a motor vehicle seat.

In particular, motor vehicle rear seats which comprise a backrest and a seat part are known from the prior art. In order to increase the space in the luggage compartment behind the motor vehicle rear seats, the backrests of the known seats may be folded up or swiveled in the direction of the seat part. In this case, it is desirable to fold the backrest completely down to the front such that, after swiveling, the rear face thereof is located on a plane with, and possibly parallel to, the luggage compartment floor. As the majority of seat parts, however, project a long way upwards it has been necessary to design the seat parts of the known motor vehicle rear seats to be able to be lowered or displaced to the front, in order to be able to swivel the backrests correspondingly far down.

Thus DE 10355765 A1 discloses a motor vehicle rear seat comprising a foldable backrest and a lowerable seat part, the backrest being able to be folded in the direction of the seat part. A mechanism is further provided so that the seat part may be lowered from an operating position into a forward displaced position. In order to couple the movement of the backrest to the movement of the seat part, a coupling member is provided, a locking mechanism being further used, by means of which the seat part may be locked in the operating position. The coupling member is in this case designed such that the locking mechanism is only unlocked when the backrest is folded forward toward the seat part, when the backrest adopts a predetermined angle of inclination. Subsequently, the movements of the backrest and seat part are coupled such that the seat part is moved, with a more extensive folding forward of the backrest, into the aforementioned lowered position. The coupling member is in this case configured as a connecting rod and/or push rod which presses onto one or more actuating levers of the mechanism of the seat part.

The known motor vehicle rear seat has proved advantageous, but is associated with the drawback that the mechanism underlying the movement is liable to failure and requires costly construction, the handling of the known motor vehicle seat being made difficult.

It is, therefore, an object of the present invention, to provide a motor vehicle seat of the generic type, which has a lower susceptibility to failure and a simple construction, the handling of the motor vehicle seat being intended to be simplified. The object of the invention is to provide, moreover, a motor vehicle with such an advantageous motor vehicle seat.

The motor vehicle seat according to the invention firstly comprises a seat part which may be moved by means of a seat part mechanism from an operating position into a non-operating position. In this case the operating position is understood as the position of the seat part in which a vehicle occupant sits on the motor vehicle seat, whereas the non-operating position, for example, may be understood as a position of the seat part lowered and/or displaced forward relative to the operating position. Furthermore, a locking means is provided for the releasable locking of the seat part in the operating position which, for example, itself acts on the seat part mechanism or the seat part.

So that the vehicle occupant may be supported from behind, the motor vehicle seat further has a backrest which may be swiveled and/or folded up by means of a backrest mechanism about a swivel pin in the direction of the seat part. The movement of the backrest is coupled via a coupling element to the movement of the seat part, the seat part being locked in the operating position during a first swiveling movement of the backrest in the direction of the seat part. During this first swiveling movement, therefore, the seat part does not move, but the backrest may be swiveled independently of the seat part to a certain degree. Only when the backrest is folded up within the context of a more extensive, subsequent second swiveling movement beyond a specific position in the direction of the seat part, does the coupling element cooperate with the locking means such that the locking of the seat part is triggered. Thus the seat part may be moved, during an even more extensive third swiveling movement of the backrest in the direction of the seat part, by the coupling element from the operating position into the non-operating position.

According to the invention, the coupling element cooperates, therefore, with the backrest mechanism and the seat part mechanism such that the coupling element exerts a tensile force on the seat part mechanism, in order to move the seat part from the operating position into the non-operating position.

This has the advantage that substantially lower requirements are set for the coupling element and/or the fitting thereof into the mechanism of the motor vehicle seat, than is the case with the use of a connecting rod or push rod, in particular because a coupling element which transmits only tensile force may be incorporated in almost any manner into the seat mechanism. Additionally, the susceptibility to failure in coupling elements, which transmit only tensile forces, is lower as the risk of mechanical jamming of the components is not as great.

In a preferred embodiment of the motor vehicle seat according to the invention, the coupling element cooperates further with the backrest mechanism and the locking means, such that the coupling element exerts a tensile force on the locking means in order trigger the locking of the seat part. Relative to the advantages, reference is made to the above embodiments.

In a further preferred embodiment of the motor vehicle seat according to the invention, a projection is provided on the coupling element which may be pulled against the locking means such that a locking of the seat part is triggered. The projection may, for example, be a lateral pin or stud on one part of the coupling element.

In order to simplify the handling of the motor vehicle seat, in a further preferred embodiment of the invention the seat part is pretensioned into the operating position, such that it may be moved counter to the pretensioning into the non-operating position and when the backrest is swiveled back automatically returns into the operating position. In this manner, the coupling element is not loaded during the swiveling-back process of the backrest—in particular not by thrust or compression. Instead, due to the pretensioning, the seat part automatically returns into the operating position. The coupling element, therefore, only has to be designed for transmitting a tensile force. By selecting pretensioning which is low but at the same time sufficient, the movement of the seat part into the non-operating position is only slightly more difficult and the return movement into the operating position is considerably simplified.

In an advantageous embodiment of the motor vehicle seat according to the invention, the seat part mechanism comprises a spring element for pretensioning the seat part into the operating position. The spring element may, for example, be a correspondingly designed helical spring which, on the one hand, is arranged on the seat part mechanism and, on the other hand, fixed to the vehicle.

In a particularly advantageous embodiment of the motor vehicle seat according to the invention, the locking means cooperate with the seat part mechanism such that the locking means automatically lock the seat part in the operating position, when the seat part is moved from the non-operating position again into the operating position. Thus, for example, on the seat part mechanism a simple pin may be provided which initially forces the locking means in the form of a pretensioned hook out of the locked position, before the hook subsequently springs back again, due to the pretensioning, into the locked position in which it encompasses the pin.

In order to permit the swivelability of the backrest independently of the seat part during the aforementioned first swiveling movement, the coupling element is secured in a preferred embodiment of the motor vehicle seat according to the invention at a first contact point to the backrest mechanism and at a second contact point to the seat part mechanism, the distance between the first and second contact points during the first swiveling movement being able to be altered, preferably also during the second swiveling movement. Thus the coupling element, for example, may be a part which may be extended to a certain degree in the manner of a telescope. This is, however, associated with a high cost, which is why the following embodiment is preferred.

In a particularly preferred embodiment of the motor vehicle seat according to the invention, the coupling element comprises, therefore, a first strut which is secured in an articulated manner at the first contact point to the backrest mechanism, and a second strut which is secured in an articulated manner at the second contact point to the seat part mechanism, the first and second struts being connected to one another via a simple pivot. A simple pivot is in this case understood as a joint which namely permits a rotation of the struts connected in an articulated manner to one another, but no displacement as might be the case with a rotary sliding joint.

In order to be able to transmit a tensile force via the coupling element to the seat part mechanism, when swiveling the backrest forward, the seat part mechanism in an advantageous embodiment of the motor vehicle seat according to the invention comprises at least one swivelable rocker lever, one side thereof being fastened to the seat part, whilst the coupling element is secured to the other side.

In a further advantageous embodiment of the motor vehicle seat according to the invention, on the rocker lever a latching means is provided which may be latched to the locking means. Relative to a possible embodiment by way of example, reference is made to the above description.

In order to be able to transmit a tensile force via the coupling element to the seat part mechanism, when swiveling the backrest forward, the backrest mechanism in a further preferred embodiment of the motor vehicle seat according to the invention comprises at least one rocker lever which may be swiveled about the swivel pin of the backrest, one side thereof facing in the direction of the backrest and being secured thereto, whilst the coupling element is secured to the other side.

In an advantageous embodiment of the motor vehicle seat according to the invention, the seat part in the non-operating position is arranged displaced to the front and/or downward relative to the operating position.

The motor vehicle according to the invention comprises a motor vehicle seat of the aforementioned type, the motor vehicle seat preferably being a motor vehicle rear seat.

Figure 2:
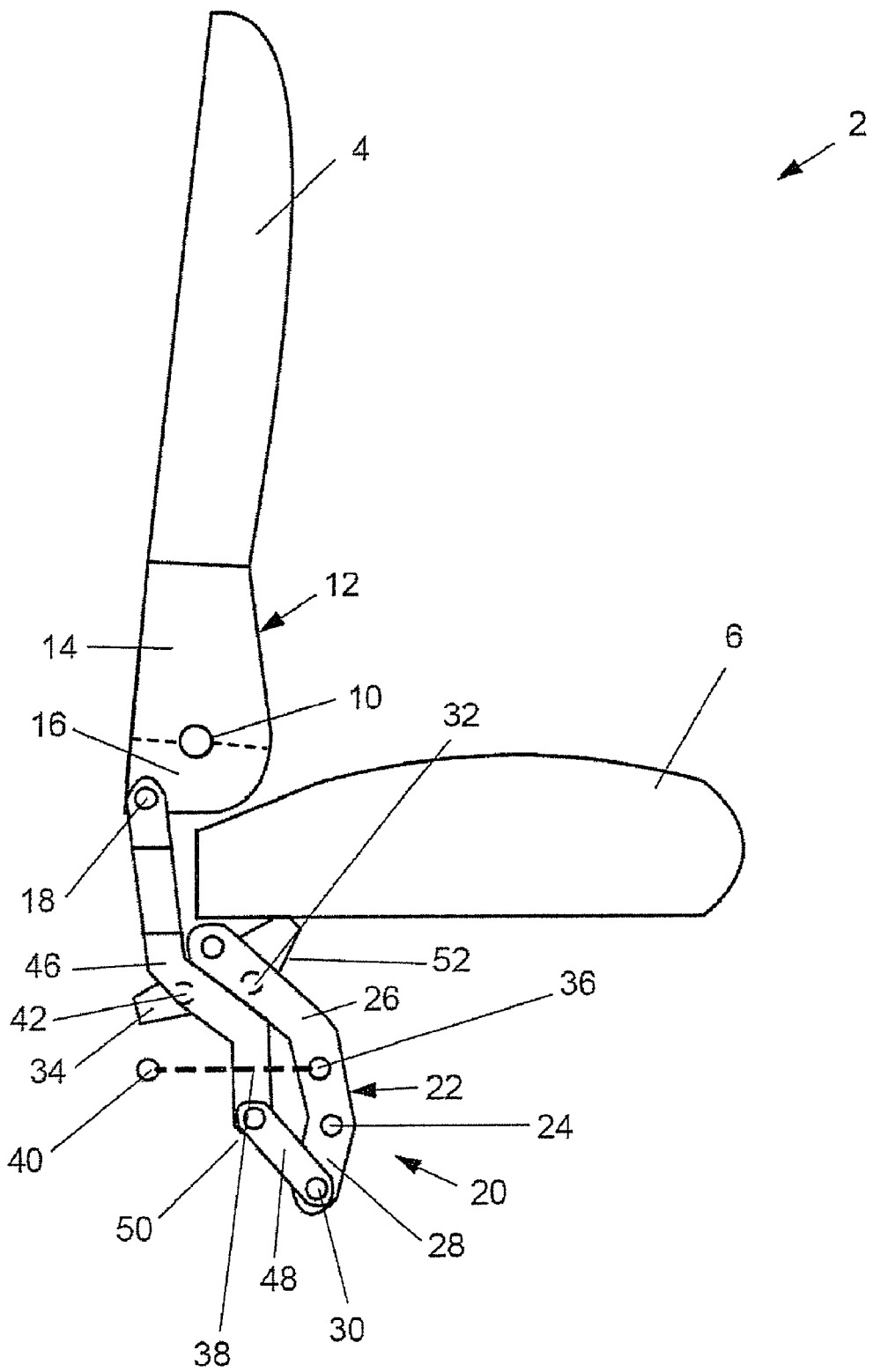
Figure 3:
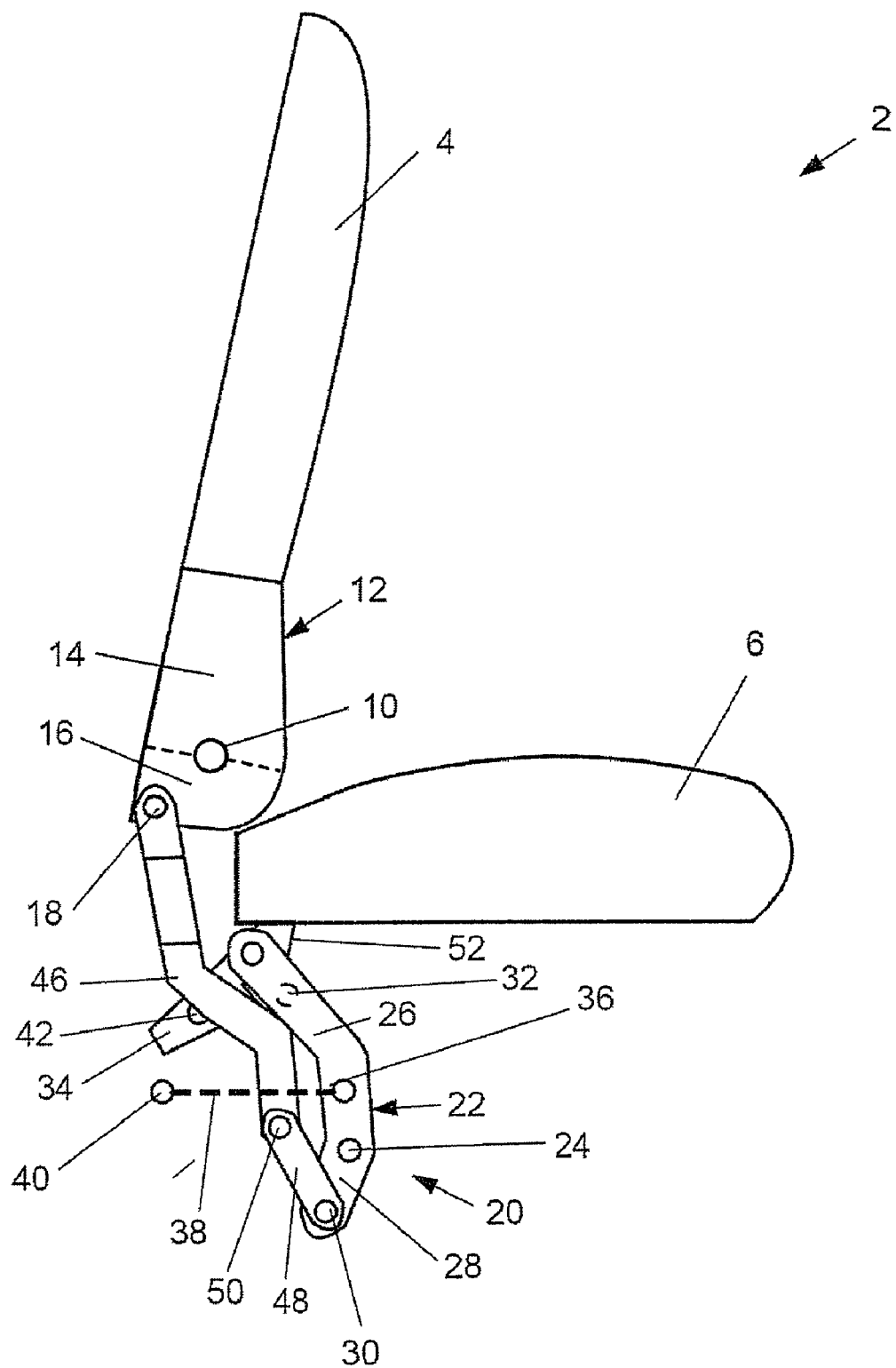
Figure 4:
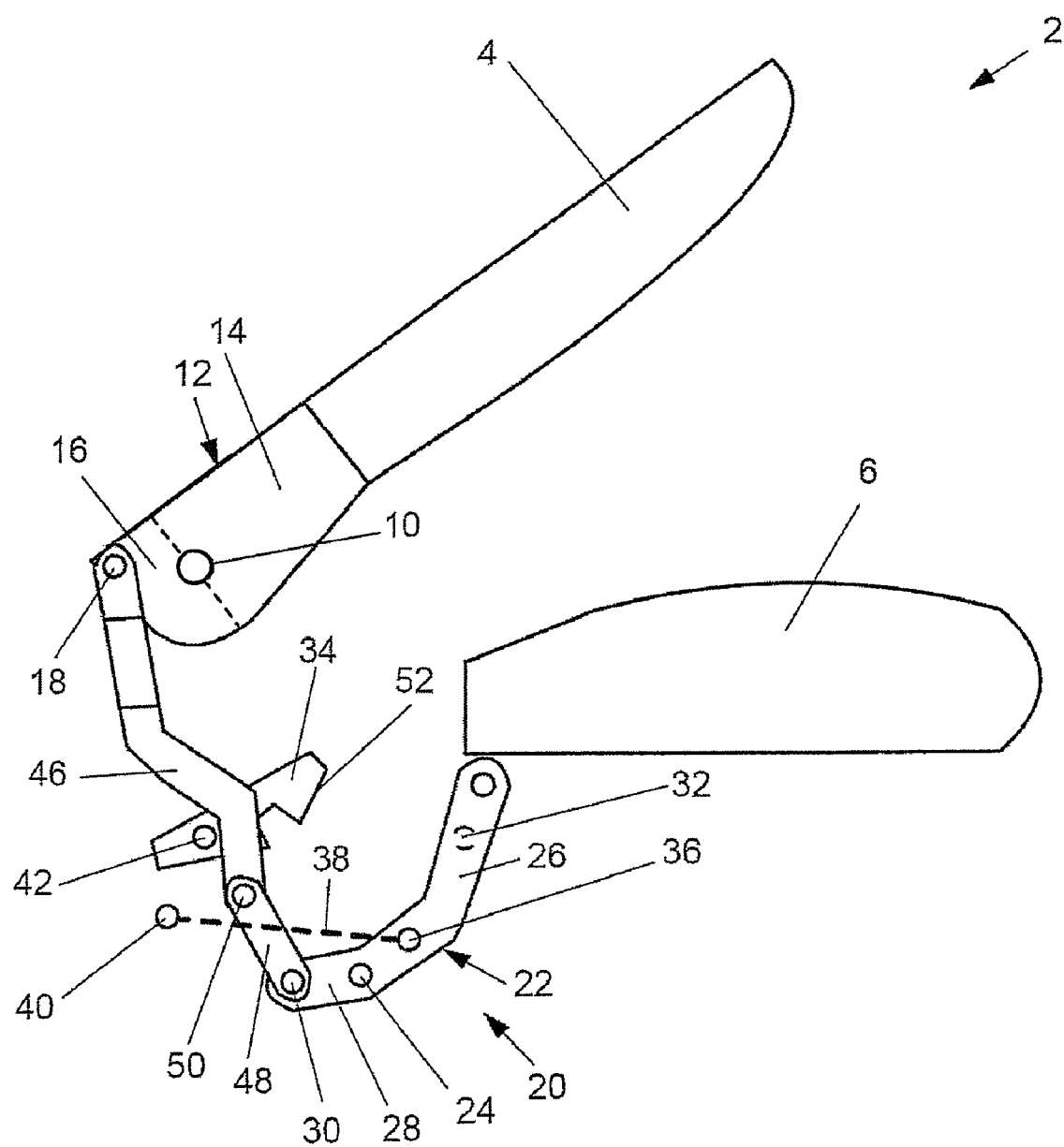
Figure 5:
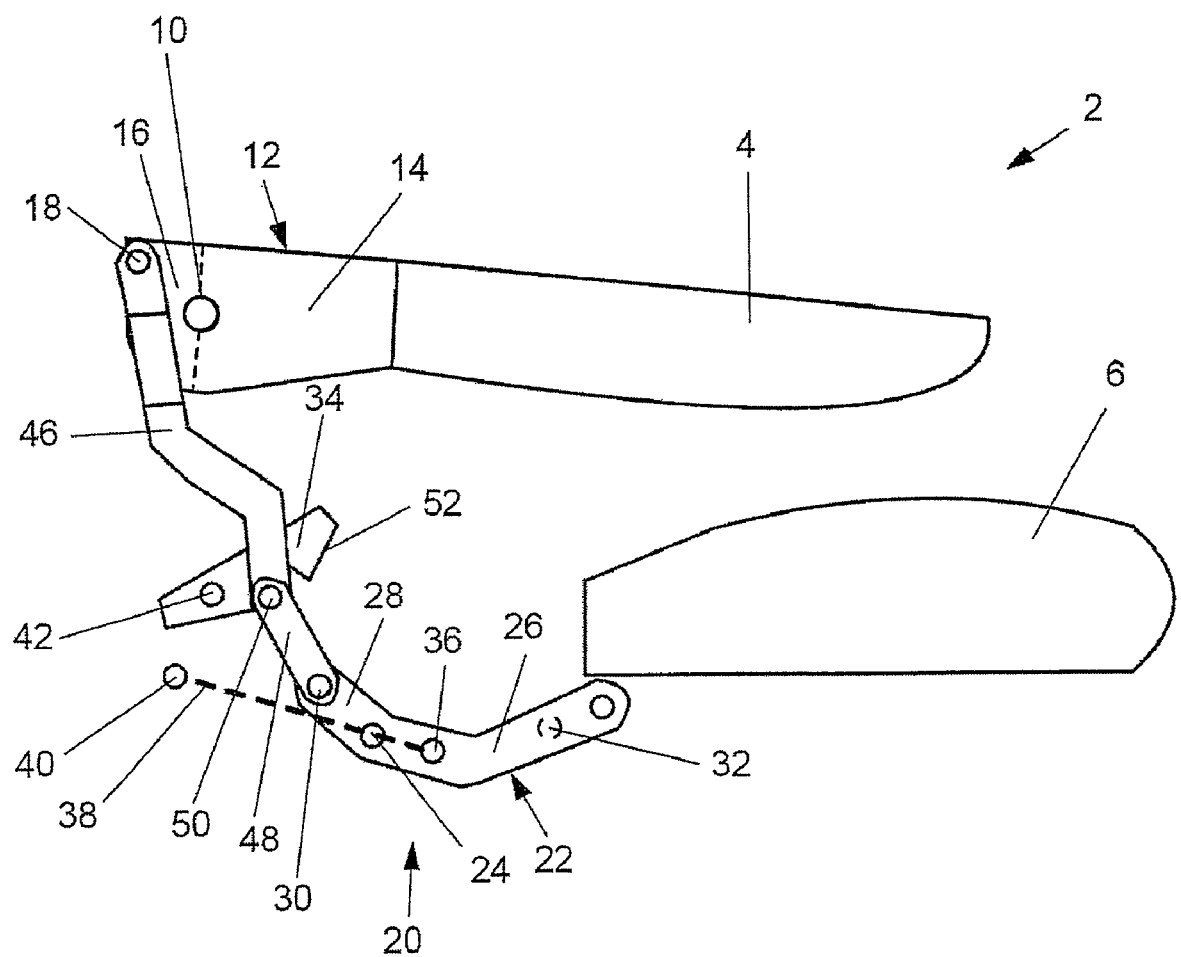

The invention is described in more detail below with reference to an embodiment by way of example and with reference to the accompanying drawings, in which:

FIG. 1 shows a side view of the motor vehicle seat according to the invention comprising a backrest swiveled back and a seat part in the operating position, FIG. 2 shows the motor vehicle seat of FIG. 1 comprising the backrest after a first swiveling movement and the seat part in the operating position, FIG. 3 shows the motor vehicle seat of FIG. 2 comprising the backrest after a more extensive second swiveling movement and the seat part in the operating position, FIG. 4 shows the motor vehicle seat of FIG. 3 comprising the backrest during an even more extensive third swiveling movement and the seat part between the operating position and the non-operating position and FIG. 5 shows the motor vehicle seat of FIG. 4 comprising the backrest after the even more extensive third swiveling movement and the seat part in the non-operating position.

FIG. 1 shows a side view of the motor vehicle seat 2 which is preferably arranged as a motor vehicle rear seat inside a motor vehicle in front of a luggage compartment arranged therebehind. The motor vehicle seat 2 comprises a backrest 4 and a seat part 6, both the backrest 4 and the seat part 6 on the side facing the vehicle occupant (not shown) being able to have a cushion.

The backrest 4 may be swiveled about a swivel pin 10 by means of a backrest mechanism in the direction of the seat part 6, as is described below in more detail with reference to the further figures. The backrest mechanism substantially comprises a rocker lever 12, which may be swiveled about the fixed swivel pin 10. In this case, the rocker lever 12 comprises a first side 14 and/or a first lever portion which faces in the direction of extension of the backrest 4 and is connected thereto. The second side 16 of the rocker lever 12 and/or the second lever portion, extends on the opposing side of the swivel pin 10. On the second side 16, therefore, a contact point 18 is provided for a coupling element to be described in more detail below which is at a predetermined distance from the swivel pin 10.

The seat part 6 may be moved from the operating position shown in FIG. 1 in which the vehicle occupant may sit on the seat part, into a non-operating position which is shown in FIG. 5 and in which the seat part 6 is lowered relative to the operating position and is arranged displaced to the front. To this end, a seat part mechanism 20 is provided below the seat part 6. The seat part mechanism 20 consists in the present embodiment of a plurality of rocker levers, which permit a lowering of the seat part 6 from the raised operating position into the lowered non-operating position displaced to the front. The rocker levers on the side of the seat part may be articulated on a supporting structure (not shown) for the seat part 6. Hereinafter, the seat part mechanism 20 is explained with reference to the rocker lever 22, which cooperates with the backrest mechanism via the coupling element to be explained below. The rocker lever 22 may be swiveled about a fixed axis 24 and has a first side 26 facing the seat part 6, the end thereof being articulated to the seat part 6 and/or the supporting structure thereof. The second side 28 of the rocker lever 22 and/or the second lever portion remote from the seat part 6, extends on the opposing side of the axis 24. On the second side 28, therefore, a contact point 30 is provided for the coupling element to be described below in more detail, which is at a predetermined distance from the axis 24.

On the side of the rocker lever 22 remote from the observer of the figures, a latching means 32 is provided, which is attached to the first side 26 of the rocker lever 22 and in the present example is configured as a laterally projecting pin. The latching means 32 may be latched to the locking means 34 to be described below in more detail and/or is latched thereto in FIG. 1. On the first side 26 of the rocker lever 22, moreover, a further projection 36 is provided to which one end of a spring element 38 (dotted view) is fastened, the spring element 38 being configured as a helical tension spring. The other end of the spring element 38 extends toward a stop 40 fixed to the vehicle, to which it is fastened. The spring element 38 is in this case pretensioned, such that the rocker lever 22 of the seat part mechanism 20 and thus the seat part 6 is pretensioned into the operating position shown in FIG. 1.

As already mentioned above, a locking means 34 is further provided which in the present example is configured as a hook (see in particular FIG. 4) which may be swiveled about a fixed axis 42 (dotted view) and is pretensioned into the position shown in FIG. 1, the view of a spring element or the like for pretensioning having been omitted. The hook-shaped locking means 34 encompasses in the operating position of the seat part 6 the latching means 32 of the rocker lever 22, so that the rocker lever 22 may not be swiveled about the axis 24. Thus the locking means 34 lock the seat part 6 in the operating position thereof. Further details will be provided below about the further modes of operation as well as the further features of the locking means 34.

The movement of the backrest 4 is coupled to the movement of the seat part 6 via the coupling element. The coupling element comprises a first strut 46 facing the backrest mechanism and a second strut 48 facing the seat part mechanism 20. The strut 46 is, on the one hand, secured in an articulated manner at the first contact point 18 to the second side 16 of the rocker lever 12 of the backrest mechanism and on the other hand via a simple pivot 50 to the second strut 48. The second strut 48 is secured in an articulated manner at its end remote from the pivot 50, at the second contact point 30 to the second side 28 of the rocker lever 22 of the seat part mechanism 20. On the side of the first strut 46 remote from the observer, moreover, a projection (not shown) is provided which together with the first strut 46 may be pulled against the locking means 34, in order to release said locking means as is disclosed below in more detail.

Hereinafter, the mode of operation of the motor vehicle seat 2 is disclosed with reference to FIGS. 1 to 6. If an operator desires to increase the space in the luggage compartment arranged behind the backrest 4, it is necessary to swivel the backrest 4 to the front and to lower the seat part 6 so that a complete swiveling forward of the backrest 4 is possible.

Thus initially a first swiveling movement of the backrest 4 about the swivel pin 10 in the direction of the seat part 6 may be carried out, in which the backrest 4 is moved from the position shown in FIG. 1 into the position shown in FIG. 2. The seat part 6 remains, during this first swiveling movement, in the operating position and is locked, i.e. the operator may swivel the backrest 4 up to a predetermined degree, without moving the seat part 6 therewith. This may be explained by the fact that the backrest mechanism exerts a tensile force on the coupling element, the first and second struts 46, 48 thereof however are of such a length that said struts are aligned one behind the other but are not yet able to transmit tensile force to the seat part mechanism 20. In other words, the distance between the first contact point 18 on the backrest mechanism and the second contact point 30 on the swiveling mechanism 20 may be altered during the first swiveling movement as the struts 46, 48 are correspondingly long and connected to one another via the simple pivot 50. Preferably, this is also intended to be the case during a more extensive second swiveling movement.

In the position shown in FIG. 2 of the backrest 4, the projection (not shown) on the strut 46 bears from beneath against a sliding guide (not shown) on the hook-shaped locking means 34. In a subsequent, more extensive second swiveling movement of the backrest 4 in the direction of the seat part 6, the projection (not shown) is now pulled further against the locking means 34, so that said locking means is swiveled upward about the axis 42 counter to the pretensioning until the hook-shaped locking means 34 releases the pin-shaped latching means 32 on the rocker lever 22 of the seat part mechanism 20. This position of the locking means 34 is shown in FIG. 3, which also shows the final position after the more extensive second swiveling movement. The locking of the seat part 6 is thus triggered. Moreover, the struts 46, 48 of the coupling element in FIG. 3 are aligned with one another such that the transmission of a tensile force from the backrest mechanism via the coupling element is now possible onto the seat part mechanism 20.

Starting from the position shown in FIG. 3, an even more extensive third swiveling movement of the backrest 4 takes place in the direction of the seat part 6. Via the coupling element a tensile force is now exerted on the rocker lever 22 of the swivel mechanism 20, originating from the backrest mechanism so that the rocker lever 22 is swiveled about the axis 24 and the seat part 6 is lowered forward via the intermediate position shown in FIG. 4 from the operating position into the non-operating position shown in FIG. 5. The swiveling of the rocker lever 22 in this case takes place counter to the tensile force of the spring element 38. The locking means 34 returns, in this case, as may be seen in FIG. 4, into its prestressed position as the projection (not shown) on the first strut 46 no longer acts on the sliding guide (not shown) on the locking means 34.

The motor vehicle seat 2 should be locked in the position shown in FIG. 5 by further locking means, before the enlarged luggage compartment is subsequently loaded. All the more so as the elongated spring element 38 which is configured as a tension spring, in the position shown, exerts a tensile force onto the projection 36 on the rocker lever 22, which could pull the seat part 6 again back into the position shown in FIG. 1. This tensile force exerted by the spring element 38, however, causes the seat part 6 when swiveling back the backrest 6, to return automatically into the operating position, without a pushing or pulling action having to be exerted via the coupling element.

Moreover, the locking means 34 and the latching means 32 on the rocker lever 22 are configured such that the locking means 34, when swiveling back the seat part 6, is initially briefly swiveled again about the axis 42, before it again engages behind the latching means. This is achieved in the present example by a bevel 52 being provided on the locking means 34 against which the pin-shaped latching means 32 may be pressed, in order to be able to swivel the locking means 34.

LIST OF REFERENCE NUMERALS

Motor vehicle seat 2
Backrest 4
Seat part 6
Backrest mechanism 8
Swivel pin 10
Rocker lever 12
First strut 46
Second strut 48
Simple pivot 50
Bevel 52

The invention claimed is:

1. A motor vehicle seat (2) comprising a seat part (6), which may be moved by means of a seat part mechanism (20) from an operating position into a non-operating position, a locking means (34) being provided for the releasable locking of the seat part (6) in the operating position, a backrest (4), which may be swiveled by means of a backrest mechanism about a swivel pin (10) in the direction of the seat part (6), and a coupling element for coupling the movement of the backrest (4) to the movement of the seat part (6), the seat part (6) being locked in the operating position during a first swiveling movement of the backrest (4) in the direction of the seat part (6), the coupling element in a more extensive second swiveling movement of the backrest (4) in the direction of the seat part (6) cooperating with the locking means (34), such that the locking of the seat part (6) is triggered and the seat part (6) may be moved during an even more extensive third swiveling movement of the backrest (4) in the direction of the seat part (6) by the coupling element from the operating position into the non-operating position, characterized in that:
   the coupling element cooperates with the backrest mechanism and the seat part mechanism (20) such that the coupling element exerts a tensile force on the seat part mechanism (20), in order to move the seat part (6) from the operating position into the non-operating position,
   the coupling element cooperates with the backrest mechanism and the locking means (34) such that the coupling element exerts a tensile force on the locking means (34) in order to trigger the locking of the seat part,
   a projection is provided on the coupling element which may be pulled against the locking means (34) such that the locking of the seat part (6) is triggered,
   the seat part (6) is pretensioned into the operating position, such that it may be moved counter to the pretensioning into the non-operating position and when the backrest (4) is swiveled back automatically returns into the operating position,
   the seat part mechanism (20) comprises a spring element (38) for pretensioning the seat part (6) into the operating position,
   the locking means (34) cooperate with the seat part mechanism (20) such that the locking means (34) automatically lock the seat part (6) in the operating position when the seat part (6) is moved from the non-operating position again into the operating position,
   the coupling element is secured at a first contact point (18) to the backrest mechanism and at a second contact point (30) to the seat part mechanism (20), the distance between the first and second contact point (18; 30) during the first swiveling movement being able to be altered, preferably also during the second swiveling movement, and
   the coupling element comprises a first strut (46) which is secured in an articulated manner at the first contact point (18) to the backrest mechanism, and a second strut (48) which is secured in an articulated manner at the second contact point (30) to the seat part mechanism (20), the first and the second struts (46; 48) being connected to one another via a simple pivot (50).

2. A motor vehicle seat (2) comprising a seat part (6), which may be moved by means of a seat part mechanism (20) from an operating position into a non-operating position, a locking means (34) being provided for the releasable locking of the seat part (6) in the operating position, a backrest (4), which may be swiveled by means of a backrest mechanism about a swivel pin (10) in the direction of the seat part (6), and a coupling element for coupling the movement of the backrest (4) to the movement of the seat part (6), the seat part (6) being locked in the operating position during a first swiveling movement of the backrest (4) in the direction of the seat part (6), the coupling element in a more extensive second swiveling movement of the backrest (4) in the direction of the seat part (6) cooperating with the locking means (34), such that the locking of the seat part (6) is triggered and the seat part (6) may be moved during an even more extensive third swiveling movement of the backrest (4) in the direction of the seat part (6) by the coupling element from the operating position into the non-operating position, characterized in that
   the coupling element cooperates with the backrest mechanism and the seat part mechanism (20) such that the coupling element exerts a tensile force on the seat part mechanism (20), in order to move the seat part (6) from the operating position into the non-operating position,
   the locking means (34) cooperate with the seat part mechanism (20) such that the locking means (34) automatically lock the seat part (6) in the operating position when the seat part (6) is moved from the non-operating position again into the operating position and
   the coupling element is secured at a first contact point (18) to the backrest mechanism and at a second contact point (30) to the seat part mechanism (20), the distance between the first and second contact point (18; 30) during the first swiveling movement being able to be altered, preferably also during the second swiveling movement.

3. The motor vehicle seat (2) as claimed in claim 2, characterized in that the coupling element comprises a first strut (46) which is secured in an articulated manner at the first contact point (18) to the backrest mechanism, and a second strut (48) which is secured in an articulated manner at the second contact point (30) to the seat part mechanism (20), the first and the second struts (46; 48) being connected to one another via a simple pivot (50).

* * * * *